E. M. COBB.
HOLLOW RIVET.
APPLICATION FILED APR. 18, 1912. RENEWED AUG. 22, 1914.
1,130,962.
Patented Mar. 9, 1915.
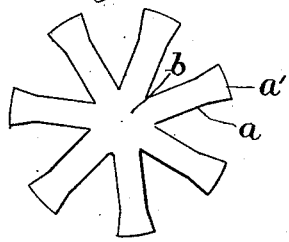
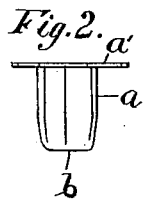
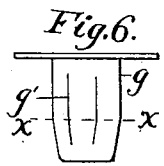
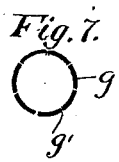
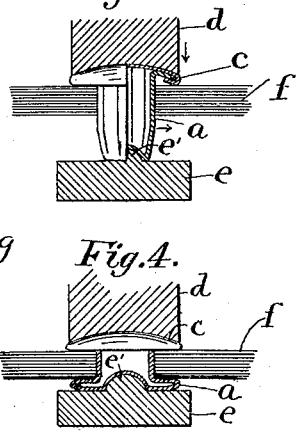
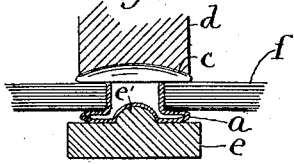
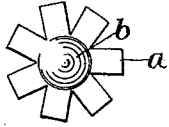
Witnesses
Pearl A. Bowie
Cora B. Creighton
Inventor
Elmer M. Cobb
by S. W. Bates
Atty.

UNITED STATES PATENT OFFICE.

ELMER M. COBB, OF PORTLAND, MAINE, ASSIGNOR TO SOUTHWORTH MACHINE COMPANY, OF PORTLAND, MAINE, A CORPORATION OF MAINE.

HOLLOW RIVET.

1,130,962.   Specification of Letters Patent.   Patented Mar. 9, 1915.

Application filed April 18, 1912, Serial No. 691,764. Renewed August 22, 1914. Serial No. 858,129.

*To all whom it may concern:*

Be it known that I, ELMER M. COBB, of Portland, in the county of Cumberland and State of Maine, have invented certain new and useful Improvements in Hollow Rivets, of which the following is a specification.

My invention relates to a hollow rivet and it is directed to the construction of a rivet of that class used in fastening papers together and for other like purposes where the shank of the rivet is crushed or upset so as to spread out and form a bearing of considerable area and without the use of a washer. Hollow rivets for fastening papers and for similar purposes have heretofore been formed up from a blank composed of radial strips projecting out from an integral center, these strips or arms being folded down to form the cylindrical body of the shank and the head or flange. Rivets of this character or those formed integral with a solid end cannot be upset by the application of pressure at the two ends without liability of the walls of the shank crushing inward and thus spoiling the rivet. Accordingly it has been customary to provide a device for upsetting these rivets which contains a retracting mandrel to be inserted into the shank of the rivet through the head.

The object of my invention is to design a hollow solid ended rivet which may be upset and flattened out without the insertion of a mandrel by simply being crushed between a follower and an anvil and which may if desired, be made with both ends closed.

I carry out the above objects by means of the rivet hereinafter described and shown.

My invention will best be understood by reference to the accompanying drawing, which shows a hollow rivet constructed according to my invention.

In the drawing, Figure 1 represents the blank for forming the shank and portion of the head, Fig. 2 is a side elevation of the rivet without the cap, Fig. 3 is part elevation and part section of the rivet in position before being crushed or upset, Fig. 4 is the same after the rivet is upset, Fig. 5 is an end view showing the expanded portion, Fig. 6 is a side elevation of a modification, and Fig. 7 is a section on the line $x\ x$ of Fig. 6.

The peculiar feature of my rivet is that the hollow shank has a solid end and is made up of a series of longitudinal sections forming a tapering end which makes an angle with the body of the rivet. The longitudinal sections are separated by joints which extend wholly or partially through the walls of the shank and which enable the sections to spread at the angle where the taper begins when the rivet is upset.

In the form shown in Figs. 1–4, the body of the rivet is formed from a blank having an integral center $b$ which eventually forms the end of the rivet and the radial arms or strips $a$ are broadened at $a'$ to form the flange. This blank is formed up as shown in Fig. 2, with a flange or head and a shank, the portion of the shank adjacent to the flange being cylindrical and the portion adjacent to the end being slightly tapering. The integral end $b$ is preferably indented or recessed as shown in Figs. 3 and 4.

A cap $c$ is applied to the flanged head in the well known manner. Thus I have a rivet with both ends closed, the point being indented and integral with the strips which form the body of the shank.

In Figs. 3 and 4 I illustrate the means by which the rivet is crushed or upset and the manner in which the shank properly expands without crushing inward.

Referring to Figs. 3 and 4, $e$ represents the anvil which is provided with boss $e'$ fitting into the indentation formed in the end of the rivet.

The follower $d$ is connected to any suitable actuating means and conforms to the shape of the head. The sheets of paper or other material to be fastened by the rivet are shown at $f$.

As the follower descends, each of the strips which form the body of the rivet tends to bend outward at the point of junction between the cylindrical portion and the tapering portion. This results from the fact that each strip makes a slight angle at a point where the taper begins, and since the thrust comes lengthwise of the strip it tends to crush or give way outward and cannot crush in as it might do if it were perfectly straight. The body of the rivet spreads out as shown in Fig. 5 to form a bearing of considerable area which is forced against the under side of the paper $f$.

The tendency of the sections to crush outward is increased by the action of the indent and the boss which offer a resistance to the inward bending of the strips and help to force them outward.

By constructing my rivet as I have described I am enabled to upset it with very simple mechanism, to form the rivet closed at both ends and to make sure that it will always expand outward and make a perfect holding device. The rivet may be forced through the material to be fastened or inserted in a hole previously made and it may be used without the cap c if desired. The indent may be omitted from the tapering end or the shank may be made cylindrical with the indent in the end but I prefer to combine the two features as here shown, one supplementing the other in aiding in the proper expansion of the shank.

It will be seen that my rivet is capable of being used with various thicknesses of material as it will crush more or less and will accommodate itself automatically to the thickness of the material to be fastened. The section adjacent to the head may be formed otherwise than cylindrical so long as it makes an angle with the tapering end whereby the outward crushing effect is produced.

A hollow rivet may be made according to my invention with the shank having integral tubular walls, by forming the rivet in the usual way and scoring or cutting the walls of the tube longitudinally. Such a construction is illustrated in Figs. 6 and 7, in which is shown a rivet g formed with integral walls and a tapering end and scored at g' to form longitudinal strips or sections extending over the angles where the taper begins and for some distance in either direction toward the head and end of the rivet. Such a rivet would crush in the same manner as if the strips were entirely separated as they would be separate at the angle where the outward bend takes place.

The scoring or cutting on the lines g' may extend only partially through the metal wall so long as it weakens the metal so that it gives way along these lines when it is crushed.

I claim:—

1. A hollow rivet having a head and a hollow shank, said shank being composed of an integral end and longitudinal strips integral with said end and being formed with a tapering section at the end, making an angle with the body of the rivet, the longitudinal joints or spaces between said strips extending over or by said angle whereby said angle is made the bending point.

2. A hollow rivet having a head and a hollow shank, said shank being composed of an integral indented end and longitudinal strips integral with said end and being formed with a tapering section at the end, making an angle with the body of the rivet, the longitudinal joints or spaces between said strips extending over or by said angle whereby said angle is made the bending point.

3. A hollow rivet having a head and a hollow shank, said shank being composed of longitudinal strips and a closed and indented end formed integral with said strips.

4. A hollow rivet having a head and a hollow shank, said shank having a closed end, and a tapering section at the end making an angle with the body of the rivet and being formed with a plurality of longitudinal sections separated by longitudinal joints extending over or by said angle and capable of giving way and permitting the sections to bend outward at said angle.

In testimony whereof I have affixed my signature, in presence of two witnesses.

ELMER M. COBB.

Witnesses:
S. W. BATES,
CORA B. CREIGHTON.